INVENTOR.
Charles Edward Butler
Robert Nichols Hazelwood
BY
Attorney

United States Patent Office 2,782,126
Patented Feb. 19, 1957

2,782,126

CERAMIC BODIES

Charles E. Butler, Huntington, W. Va., and Robert Nichols Hazelwood, Milwaukee, Wis., assignors to McGraw Electric Company, Milwaukee, Wis., a corporation of Delaware Application April 30, 1953, Serial No. 352,104

2 Claims. (Cl. 106—46)

This invention relates to electrical or ceramic insulating materials, and particularly to a method of selecting ingredients for preparing said materials to provide improved electrical and mechanical characteristics, a lower firing temperature, a wide firing range, and a fast firing cycle.

The copending application filed by C. E. Butler on April 29, 1953, Serial No. 352,045, and assigned to the same assignee as the present invention, relates to the introduction of a pre-formed glass frit as a component of the unfired body mixture, which frit provides certain desired characteristics to the body when completely fired. The frit disclosed in that application preferably contains ingredients comprising barium oxide, sodium oxide, boric oxide, zinc oxide, and silicon dioxide. The frit contains no lead, phosphate, or fluorite; and in addition, provides a porcelain body which may be fired to vitrification in a single firing, achieving a state of non-porosity as with a true porcelain.

It is an object of the present invention to provide a selection or range of optimum percentages of the disclosed glass frit, which percentages will provide a porcelain article with improved mechanical and electrical properties, faster firing cycles, lower firing temperatures, and wider firing ranges.

Referring now to the drawings.

As an example of a pre-formed glass frit providing the desired improved characteristics disclosed in each of the various figures, one may select a frit manufactured under the disclosure of U. S. Patent No. 2,321,657, granted to A. E. Chester on June 15, 1943, and having the following components in terms of its oxides:

| | Percent |
|---|---|
| Silicon dioxide ($SiO_2$) | 24.58 |
| Iron and aluminum oxide ($R_2O_3$) | 1.26 |
| Zinc oxide (ZnO) | 12.56 |
| Calcium oxide (CaO) | 0.25 |
| Barium oxide (BaO) | 32.91 |
| Magnesium oxide (MgO) | 0.20 |
| Sodium oxide ($Na_2O$) | 9.42 |
| Potassium oxide ($K_2O$) | 0.05 |
| Boric oxide ($B_2O_3$) | 18.13 |
| Fluorine ($F_2$) | 1.34 |
| | 100.70 |
| $O_2$ equivalent of $F_2$ | −0.56 |
| | 100.14 |

A typical porcelain body used for determining the preferred percentage ranges of frit to be added comprised 10% by weight of ball clay, 22% by weight of china clay, 48% by weight of feldspar-cone 8, and 20% by weight of silica. The basic composition was mixed with approximately 10% of a suitable organic binder, such as 2% gum Arabic solution, and pressed by conventional methods. It will be seen from Fig. 1 that the maximum firing temperature required to completely fire this body, without the addition of frit, was in the neighborhood of 2320° F. The basic components were mixed according to the above ratios in all of the various examples tested.

Figure 1:
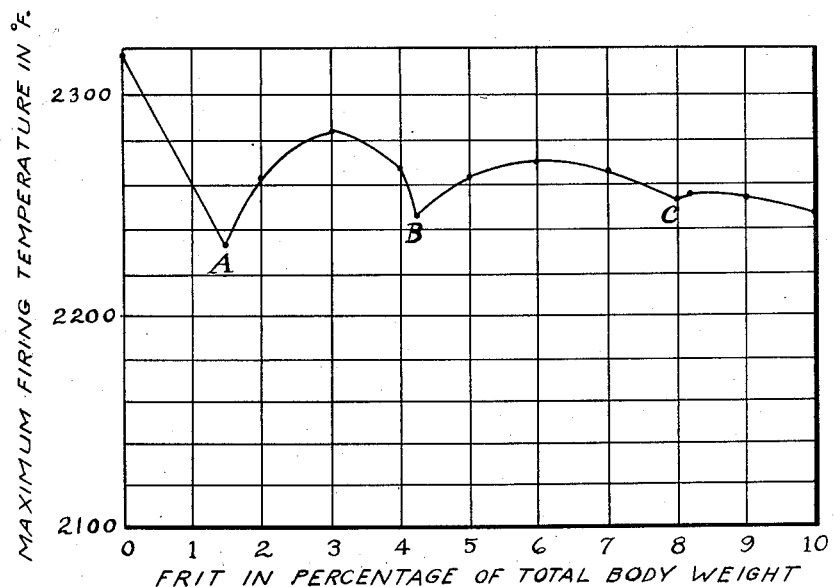
Fig. 1 illustrates a curve obtained by plotting the maximum firing temperature versus selected percentages of added frit.

The curve of Fig. 1 clearly shows the manner of selecting optimum portions of frit included in a basic porcelain mixture to provide the desired results. It will be apparent that the curve is somewhat comparable to a phase-equilibrium diagram and provides pseudo-eutectic points at A, B and C.

The curve of Fig. 1 clearly brings forth that the mere addition of even the slightest amount of frit materially reduces the maximum firing temperature. Where no frit is contained in the mixture, the maximum temperature was found to be in the neighborhood of 2320° F.; whereas, the addition of even 1% frit reduces the temperature to 2260° F. When one realizes that there is great expense involved in equipment and fuel for firing ceramic ware at relatively high temperatures, a decrease of 60 degrees can amount to considerable savings in operating and manufacturing costs.

The frit percentages defined at the abscissas of the pseudo-eutectic points A, B and C define limits existing therebetween that provide excellent characteristics to the fired ware as will be seen hereinbelow, in connection with Figs. 2, 3 and 4. The percentage at A, B and C, although providing material reductions in firing temperature, do not result in products having desired mechanical strength, as may be clearly seen in Fig. 3. Undoubtedly, the pseudo-eutectic formed does not provide a complete bond between the crystallite structure of the porcelain and the frit, although the body vitrifies at the temperatures corresponding to A. B, and C. The points A, B and C do, however, define percentage limits of added frit, which include maxima ordinates at approximately 3% and 6%, as shown in Fig. 1. These ordinates do define excellent mechanical and electrical properties as may be seen in Fig. 2, 3 and 4.

Figure 2:
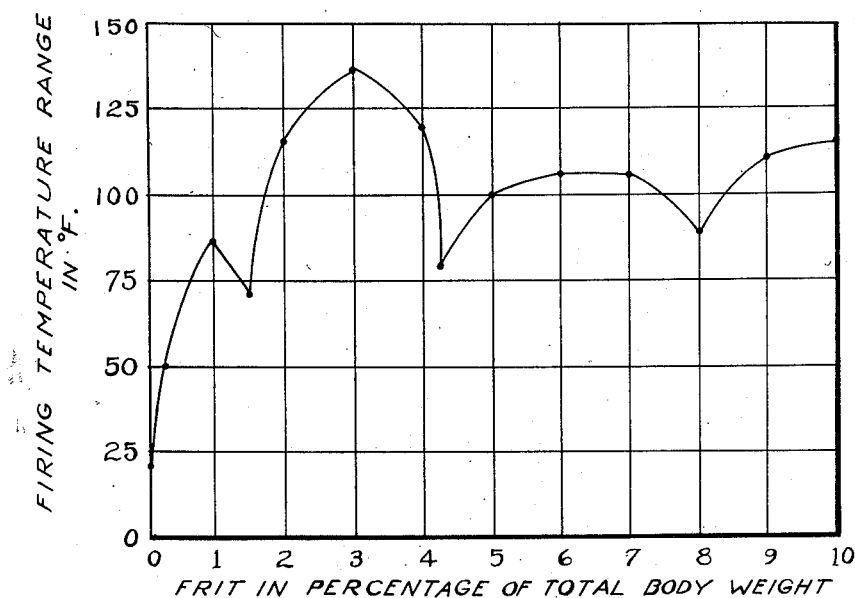
Fig. 2 illustrates a curve obtained by plotting the firing temperature range versus selected percentages of added frit.

Referring now to Fig. 2, it will be seen that similar marked effects take place at selected frit percentages with regard to the acceptable range in firing temperatures. A reasonably wide range of temperature (e. g. better than 20° F.) is desired for production of porcelain materials, to obtain the most effective and efficient products with conventional methods of manufacture. It will be obvious from Fig. 2 that the basic porcelain body without the addition of frit has a firing temperature range of approximately 17° F. However, the mere addition of even a small percentage of frit increases the firing temperature range considerably. For instance, 1% frit provides a range of approximately 85° F. Pseudo-eutectic points are indicated at approximately 1½%, 4% and 8% of added frit, which define areas with maxima points at approximately 3% and 6%.

Figure 3:
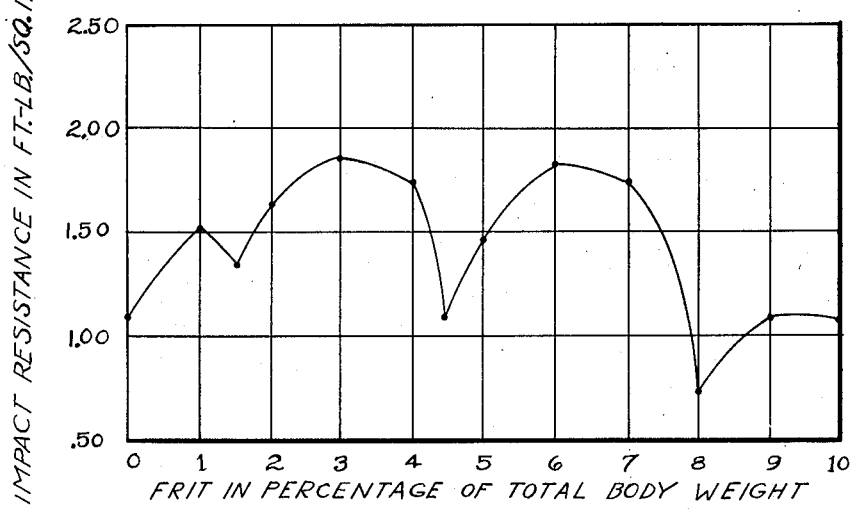
Fig. 3 illustrates a curve obtained by plotting the impact resistance versus selected percentages of added frit.

The impact resistance is indicated by the curve of Fig. 3, and is shown to be approximately 1.12 ft. lb./sq. in. for basic mixtures containing no frit additions. It will again be seen that approximately 4% and approximately 8% frit provide pronounced deflections to the curve with a materially increased impact resistance at approximately 3% and 6% of added frit.

Figure 4:
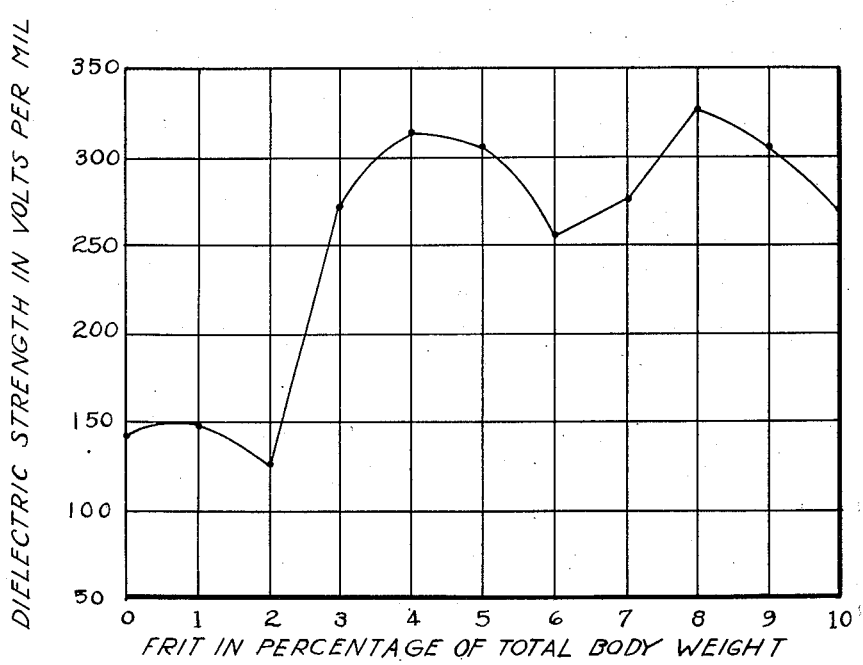
Fig. 4 illustrates a curve obtained by plotting the dielectric strength versus selected percentages of added frit.

The dielectric strength is also affected by certain frit percentages as may be seen in Fig. 4. A basic body composition containing no frit has a dielectric strength of approximately 140 volts per mil, whereas the addition of certain portions of frit increase the dielectric strength considerably. The dielectric strength increases to approximately 270 volts per mil at 3% and 260 volts per mil at 6% concentration of frit. These concentrations indicate marked increases in the electrical properties, but are less than the dielectric strength at the pseudo-eutectics of Fig. 1.

It will be apparent that a convenient method has been provided for selecting optimum amounts of a glass frit to be added to a basic porcelain mixture to provide improved physical and electrical characteristics, which method utilizes the selection of defining pseudo-eutectic points selected from the maximum firing temperatures resulting from a variety of frit concentrations.

We claim:

1. An insulator body composition consisting essentially of a porcelain base of about 32% clay, about 48% feldspar and about 20% silica by weight of said base, and from about 1¾% to about 4% by weight of the total body composition of a glass frit consisting essentially of the following ingredients in the approximate indicated percentages by weight of total frit:

| | |
|---|---|
| $BaO$ | 33 |
| $SiO_2$ | 25 |
| $B_2O_3$ | 18 |
| $ZnO$ | 13 |
| $Na_2O$ | 9 |

2. The method of preparing an electrical porcelain body composition characterized on firing by a substantially non-porous texture which comprises preparing a raw batch porcelain base consisting essentially of about 32% clay, about 48% feldspar, and about 20% silica by weight of such base, and from about 1¾% to about 4% by weight of the total body composition of a preformed glass frit consisting essentially of the following ingredients in the approximate indicated percentages by weight of total frit:

| | |
|---|---|
| $BaO$ | 33 |
| $SiO_2$ | 25 |
| $B_2O_3$ | 18 |
| $ZnO$ | 13 |
| $Na_2O$ | 9 |

References Cited in the file of this patent

UNITED STATES PATENTS

| 474,286 | Brewster | May 3, 1892 |
| 2,135,915 | Schonbeck et al. | Nov. 8, 1938 |

FOREIGN PATENTS

| 198,607 | Great Britain | (1923) |